(12) United States Patent
McGuire et al.

(10) Patent No.: US 11,808,684 B2
(45) Date of Patent: Nov. 7, 2023

(54) FRENCH PRESS PERMEAMETER

(71) Applicant: Lafayette College, Easton, PA (US)

(72) Inventors: Michael P. McGuire, Easton, PA (US); Mary J. S. Roth, Easton, PA (US)

(73) Assignee: Lafayette College, Easton, PA (US)

( * ) Notice: Subject to any disclaimer, the term of this patent is extended or adjusted under 35 U.S.C. 154(b) by 55 days.

(21) Appl. No.: 17/654,513

(22) Filed: Mar. 11, 2022

(65) Prior Publication Data

US 2022/0307965 A1    Sep. 29, 2022

Related U.S. Application Data

(60) Provisional application No. 63/200,716, filed on Mar. 24, 2021.

(51) Int. Cl.
*G01N 15/08*     (2006.01)
*G01N 33/24*     (2006.01)
*E21B 49/00*     (2006.01)

(52) U.S. Cl.
CPC ......... *G01N 15/0826* (2013.01); *E21B 49/00* (2013.01)

(58) Field of Classification Search
CPC .... G01N 15/00; G01N 15/08; G01N 15/0826; G01N 33/24; E21B 49/00
See application file for complete search history.

(56) References Cited

U.S. PATENT DOCUMENTS 6,938,461 B1 * 9/2005 Johnson .................. E21B 49/00
                                                                        73/37
10,809,175 B1 * 10/2020 Ayadat ............... G01N 15/0826

FOREIGN PATENT DOCUMENTS

| CN | 110426336 A | * | 11/2019 | ............ G01N 15/08 |
| CN | 111650107 B | * | 11/2022 | ............ G01N 13/04 |
| CN | 111504882 B | * | 4/2023 | ......... G01N 15/0826 |
| KR | 101907608 B1 | * | 10/2018 | ............ G01N 33/24 |

OTHER PUBLICATIONS

Banagan, et al., "Microbial Strengthening of Loose Sand", Letters in Applied Microbiology, vol. 51, No. 2, Jul. 9, 2010, 138-142.
Elton, et al., "Adding Excitement to Soils: A Geotechnical Student Design Competition", International Journal of Engineering Education, vol. 22, No. 6, 2006, 1325-1336.
Roth, et al., "Poster Presentation: Establishment of a Biofilm in a Soil Column Is Correlated to Reduced Permeability", 8th ASM Conference on Biofilms, Washington, DC, Jul. 10, 2018.
(Continued)

*Primary Examiner* — Nguyen Q. Ha
(74) *Attorney, Agent, or Firm* — Vos-IP, LLC

(57) ABSTRACT

A permeameter device comprising a pedestal base, wherein said pedestal base comprises an inner raised wall and an outer raised wall, wherein the inner raised wall is lower in height than the outer raised wall, a trough defined between the outer and inner walls of dimensions to accept therein a cylindrical tube, and at least one passage, having an inner port on said inner wall and extending through the outer wall through an outer port for fluid connection through said passage, and a loading rod, wherein a sample is prepared to fit within the cylindrical tube.

13 Claims, 10 Drawing Sheets

(56) References Cited

OTHER PUBLICATIONS

Roth, et al., "Reducing Permeability in Sands", Center for Bio-Mediated and Bio-Inspired Geotechnics Mid-Year Meeting, Davis, California, Apr. 3, 2017.

Roth, et al., "Reducing Soil Permeability Using In Situ Biofilm-Forming Bacteria: Overcoming Testing Apparatus Challenges", Proceedings, Geo-Congress 2019: Soil Improvement, Mar. 24, 2019, 187-195.

Saini, et al., "Poster Presentation: Inhibition of Quorum Sensing Affects Biofilm Formation by Pseudomonas Fluorescens MIC102L in Sandy Soil", General Meeting of the American Society for Microbiology, New Orleans, LA, Jun. 2, 2015.

Schuster, et al., "Reliability Analysis of Building Serviceability Problems Caused by Excavation", Géotechnique, vol. 58, No. 9, Nov. 2008, 743-749.

Schuster, et al., "Serviceability Limit State for Probabilistic Characterization of Excavation-Induced Building Damage", Probabilistic Applications in Geotechnical Engineering, Geotechnical Special Publication 170, Oct. 2007, 1-10.

Snyder, et al., "Evaluation of Soil-Washing Process for "Unwashable" Clays and Silts From the Palmerton Zinc Site", Remediation, vol. 6, No. 1, Winter 1995, 69-80.

Suleiman, et al., "Measured Soil-Pile Interaction Pressures for Small-Diameter Laterally Loaded Pile in Loose Sand", GeoFlorida 2010: Advances in Analysis, Modeling & Design, 199, 2010, 1498-1506.

Thomas, et al., "Evaluation of Site Characterization Methods for Sinkholes in Pennsylvania and New Jersey", Engineering Geology, vol. 52, Nos. 1-2, Mar. 15, 1999, 147-152.

Tunnell, et al., "Soil Washing Evaluation Program for Palmerton Zinc Site", Hazardous and Industrial Wastes: Proceedings of the Twenty-Fifth Mid-Atlantic Industrial Waste Conference, 1993, 65-71.

Tunnell, et al., "Soil-Washing Evaluation Program for Palmerton Zinc Site", Journal of Environmental Science and Health, Part A: Environmental Science and Engineering and Toxicology, vol. 31, No. 6, 1996, 1459-1468.

* cited by examiner

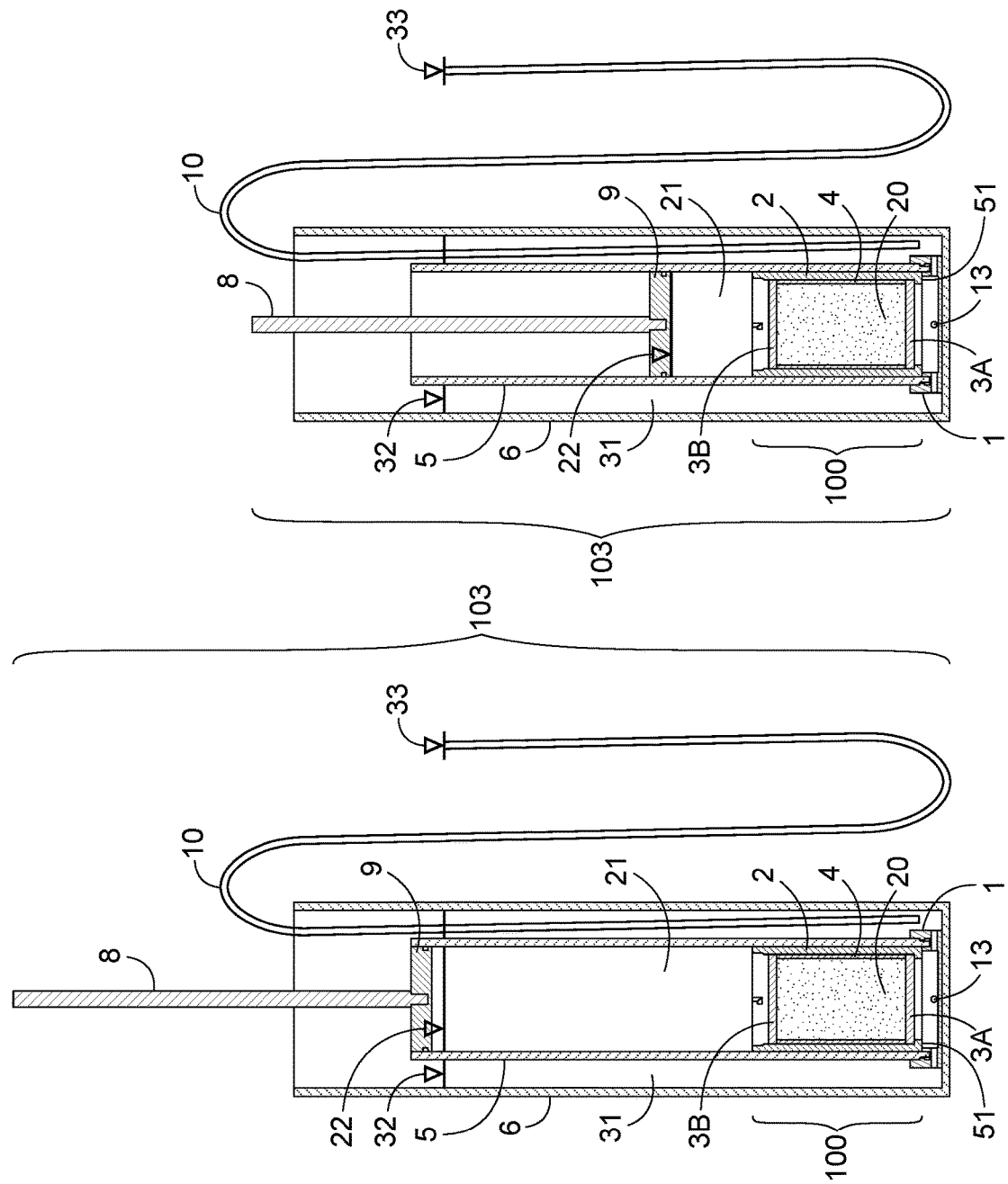

FRENCH PRESS PERMEAMETER

CROSS-REFERENCE TO RELATED APPLICATIONS

This application claims the benefit of U.S. Provisional Patent Application No. 63/200,716 filed on Mar. 24, 2021, with the United States Patent and Trademark Office, the contents of which are incorporated herein by reference in their entirety.

FIELD OF INVENTION

The present invention is generally related to permeameter devices, specifically those for testing permeability of fluids through a particulate media.

BACKGROUND OF THE INVENTION

The permeability of soil, also known as hydraulic conductivity, is defined as the soil's conductivity to fluid flow. The permeability of soil to fluid flow depends upon the size and connectivity of voids in the soil (i.e., the voids being the volume of the soil material not occupied by solid particles), the composition of the solids in the soil (i.e., the distribution of sizes and the mineralogy of the solid particles), and the degree of saturation of the soil, defined as the percentage of the voids that contain fluid by volume. The permeability of different types of soils can vary as many as twelve orders of magnitude. Even within an apparently homogenous volume of soil, permeability can significantly vary due inherent compositional variability and anisotropy.

The rate of fluid flow through saturated soil, in which all of the voids are full of fluid, is a function of the soil's permeability and the gradient in fluid pressure, defined as the spatial rate of change in the total hydraulic head (i.e., energy) of the fluid. Hydraulic gradients can exist due to natural effects such as groundwater moving from higher to lower elevation and due to unnatural (forced) gradients. Unnatural (forced) gradients can be imposed by pumping fluid out of the soil or injecting fluid into the soil.

Estimating the rate of fluid flow is important to solving many engineering problems, including liquid contaminate transport modeling, stormwater management, evapotranspiration modeling for agriculture and landfill covers, site dewatering and groundwater extraction, seepage modeling through dams and levees, liquefaction assessment, ground improvement, and the stability of building foundations and retaining structures.

Given that estimating rate of fluid flow through soil is important for many engineering problems, that the permeability of the soil influences the rate of flow, and that permeability is a property that is highly variable, considerable attention has been paid to estimating soil permeability. Field measurements of permeability, such as pump tests, are the best way to evaluate the permeability of soils in the ground at the scale of the project site. This is because field tests minimize disturbance to the soils that can alter permeability and field measurements of permeability are based on a volume soil that is much larger than a sample used in a typical laboratory test. A measurement of permeability that involves a larger volume of soil more closely reflects the net effect of the variability within the volume of soil; thus, enabling better modeling of fieldscale condition (e.g., for sizing pumps for site dewatering).

Despite the limitations introduced by sampling disturbance and small sample size, laboratory measurements of permeability are indispensable because they typically can be performed at significantly lower cost compared to field tests and the boundary conditions are controlled and well understood. Furthermore, in many applications, the permeability of soil as prepared in the lab, such as by compaction, is of interest and sampling disturbance is not a relevant concern.

Laboratory tests for permeability may be broadly divided into three categories: constant head tests, falling head tests, and falling head-rising tail tests. Constant head tests maintain fixed hydraulic boundary conditions at the upstream end of the sample, also known as headwater (i.e., where flow enters), and downstream end of the sample, also known as tailwater (i.e., where flow exits). Since both the headwater and tailwater boundary conditions are fixed and the length of the sample in the direction of flow is known, the hydraulic gradient is unchanged throughout the duration of the test. Normally, constant head tests require a continual feed of water to maintain the elevation of an upstream reservoir for the headwater and a continual draining of water to maintain the elevation of the downstream reservoir of the tailwater.

Falling head tests maintain a constant head at tailwater only. As the name implies, the hydraulic head at headwater decreases over time. Since the hydraulic head at the headwater decreases while the head at the tailwater is held constant, the hydraulic gradient in the sample decreases throughout the duration of the test. Usually, the upstream hydraulic condition is established using a standpipe that is not replenished once the test begins. Water is continually drained from the downstream reservoir to maintain a constant elevation of the downstream reservoir.

Falling head-rising tail tests do not maintain constant hydraulic boundary conditions on either end of the sample. Instead, water flows from the upstream nonreplenished standpipe, through the sample, and into the downstream standpipe without any drainage. The hydraulic gradient is not constant during the test. Excluding evaporation, no fluid leaves the hydraulic system throughout the duration of the test.

Existing laboratory testing devices in regular use for measuring permeability of saturated soils apply a hydraulic gradient to a cylindrical soil specimen using water-filled tubing with one tube connected to the top of the specimen and a second tube connected to the bottom of the specimen. The other end of each tube is connected to a reservoir or, in specialized applications, a sophisticated, digitally controlled flow pump. Fixed hydraulic boundary conditions are established on one or both ends of the specimen by setting the elevation(s) of the reservoirs, pressurizing the vessel containing the reservoir using air pressure, or using a flow pump.

There are several drawbacks to using an apparatus with multiple components connected by tubing. These drawbacks include relatively complex procedures that are needed to remove air bubbles from the apparatus (deairing) and significant lab space requirements. If the soil materials being tested or if the fluid used in the test is contaminated, e.g., to replicate conditions at a waste disposal site, the equipment must be decontaminated afterward, and the fluids and soils used must be disposed of properly. There is also the potential for biological clogging in the apparatus. Due to the high ratio of its internal surface area to volume, tubing is particularly susceptible to bacteria and biofilm growth that can lead to some degree of clogging. Flow disruptions caused by clogging can change the outcome of the tests, without the ability to control for these changes. To overcome this issue in tests where bacterial processes are not desired in the soil, sterile, deionized, or RO/DI water is used. However, such fluid is not a representative sample of the fluids flowing through the soil, for example, when leachate from a landfill is being tested, or where it is desirable to introduce fluid that intentionally encourages the growth of bacteria in the sample.

Using conventional equipment, constant head tests are typically used for high permeability soils (sands and gravels), falling head tests are used for moderate to low permeability soils (silts and clays), and falling head-rising tail tests are used for very low permeability soils (clays). These distinctions are not relevant to the present embodiment.

Herein, a new device is detailed that reduces the complexity of the hydraulic system needed to perform permeability testing. The apparatus requires essentially no tubing and can be effectively deaired using a simple and novel procedure. The apparatus is configurable to perform all three types of permeability tests.

SUMMARY OF THE INVENTION

Embodiments of the present disclosure are related to a vertical permeability testing apparatus that uses a piston and cylinder design inspired by a French coffee press to perform falling head, constant head, and falling head-rising tail permeability tests.

In the embodiments herein, a permeability apparatus comprises a vessel, a displacement controlled loading rod, a gasket plunger, a pair of porous disks to support a soil sample, a cylindrical confining ring to contain the sample, retain the porous disks, and connect the plunger rod in certain configurations, and a base to said vessel comprising a drain port; wherein a sample of soil is defined between said pair of porous disks.

The present embodiments detail a vertical style permeameter that can be configured to perform: (A) constant head tests (101) as detailed in FIGS. 8A and 8B, (B) falling head rising-tail tests (102), as detailed in FIGS. 9A and 9B, and (C) falling head tests (103), as detailed in FIGS. 10A and 10B. In performing the test, the sample and fluids are contained within cylindrical tubes that are assembled coaxially and permit movement of water through the sample specimen. The sample is confined radially by a cylindrical sleeve and vertically by porous stones. The downstream head is governed by the height of the downstream water column. The upstream head is governed by the height of the upstream water column and pressure that is induced by an applied vertical load.

In preparing a sample, a key factor is ensuring that the apparatus is not trapping air that would reduce the reliability of the flow of fluids through the sample. Thus, a deairing process is required to prepare a sample and the apparatus for a test. Deairing of the apparatus is achieved by cyclically displacing the sample using small vertical oscillations under atmospheric or subatmospheric conditions. Other than a syphon used to fix the downstream head for falling head tests, there is no tubing involved in the embodiment. The syphon tubing does not need to be deaired and can be sized to have a diameter that is less prone to biological clogging. Other deairing processes might include sonication of the sample, or vacuum preparation, though both require more equipment and are unnecessary options.

Constant head and falling head-rising tail tests performed using this embodiment produce no effluent (i.e., are self-contained), which is desirable for tests performed with contaminated soils and/or fluids. Additionally, constant head tests performed using this embodiment do not require a continuous feed of influent, which is desirable for tests performed where a limited quantity of fluid is available (e.g., fluid sampled from field) and for tests performed in a field lab.

In a preferred embodiment, a soil sample permeability testing apparatus comprising a pedestal base, said pedestal base comprising an inner raised wall having a first height and an outer raised wall having a second height, said first height being shorter than said second height, a trough defined between the outer raised wall and the inner raised wall of dimensions configured to accept therein a cylindrical tube, said cylindrical tube having an inner diameter, and at least one passage having an inner port on said inner raised wall and extending through the outer raised wall through an outer port for fluid connection through said passage, a loading rod, and a sample assembly.

In certain embodiments, the loading rod is connected to the sample apparatus via a connector and retaining ring.

In certain embodiments, the loading rod is connected to a plunger, said plunger fitting within the cylindrical tube.

In a further preferred embodiment, the apparatus wherein the sample assembly comprises an inner sleeve and an outer sleeve; said inner sleeve nesting within said outer sleeve and comprising an upper porous disk and a lower porous disk, each of said upper porous disk and said lower porous disk having a diameter, wherein said outer sleeve comprises a lower flange positioned on an inner face at a bottom of said outer sleeve for receiving the lower porous disk; and a locking ring, said locking ring having a diameter, and said locking ring comprising a locking mechanism to attach said locking ring to said outer sleeve, thereby locking said upper porous disk into place. In a further preferred embodiment, the apparatus wherein a sample is defined within said sample assembly.

In a further preferred embodiment, the apparatus wherein said inner port and said outer port can be modified from an open position to a closed position.

In a further preferred embodiment, the apparatus wherein said outer raised wall comprises an inner face and wherein said inner face comprises at least one locking tab which engages with at least one locking recess on said cylindrical tube.

In a further preferred embodiment, the apparatus wherein upon locking said locking tab in said at least one locking recess a watertight seal is created between said cylindrical tube and said pedestal base.

In a further preferred embodiment, the apparatus further comprising a gasket between said cylindrical tube and said pedestal base.

In a further preferred embodiment, the apparatus wherein the diameters of the upper porous disk, the locking ring, and the lower porous disk are of a smaller diameter than the inner diameter of the cylindrical tube.

In a further preferred embodiment, the apparatus wherein the sample assembly creates a watertight seal between the outer sleeve and the cylindrical tube; and wherein said sample assembly has a watertight slip fit within said cylindrical tube.

In a further preferred embodiment, the apparatus wherein the sample assembly comprises a compressible circumferential seal which is of a diameter to be in direct contact with the inner diameter of the cylindrical tube.

In a further preferred embodiment, the apparatus wherein the loading rod is secured to the sample assembly via a connector and wherein the sample assembly slidably engages an interior surface of the cylindrical tube through a force applied to the loading rod.

In a preferred embodiment, a method of performing a constant head test comprising: creating a soil sample within an outer sleeve, wherein the outer sleeve achieves a watertight slip fit into a cylindrical tube; said cylindrical tube oriented onto a pedestal base comprising an inner raised wall, an outer raised wall, and a trough therebetween, with at least one passage having an inner port defining a passage through the inner raised wall and an outer port in the outer raised wall, at least one of said inner port or said outer port being closed to prevent fluid from exiting the pedestal base, and a connector which is attached to a loading rod; saturating the soil sample with a fluid within the cylindrical tube; applying a constant force to said loading rod, thereby moving said soil sample through said cylindrical tube; and calculating permeability of the soil sample by taking measurements of vertical velocity of the soil sample due to the applied constant force.

In a further preferred embodiment, the method provided by configuration I.

In a preferred embodiment, a method of performing a falling head-rising tail test comprising: creating a soil sample within an outer sleeve, wherein the outer sleeve achieves a watertight slip fit into a cylindrical tube; said cylindrical tube oriented onto a pedestal base comprising an inner raised wall, an outer raised wall, and a trough therebetween, with four passages each having a first projection through the inner raised wall and a second projection through the outer raised wall open to allow fluid to be exchanged between the pedestal base and an outermost cylindrical vessel; and a gasketed plunger which is attached to a loading rod; saturating the soil sample with a fluid within the cylindrical tube and achieving an initial fluid level in the outermost cylindrical vessel; applying a constant force to said loading rod, thereby moving said gasketed plunger through said cylindrical tube; and calculating permeability of the soil sample by taking measurements of vertical position of the gasketed plunger at multiple times during the falling head-rising tail test.

In a further preferred embodiment, the method provided by configuration II.

In a preferred embodiment, a method of performing a falling head test comprising: creating a soil sample within an outer sleeve, wherein the outer sleeve achieves a watertight slip fit into a cylindrical tube; said cylindrical tube oriented onto a pedestal base comprising an inner raised wall, an outer raised wall, and a trough therebetween, with four passages each having a first projection through the inner wall and a second projection through the outer wall open to allow fluid to be exchanged between the pedestal base and an outermost cylindrical vessel, and a gasketed plunger which is attached to a loading rod; saturating the soil sample with a fluid within the cylindrical tube and achieving an initial fluid level in the outermost cylindrical vessel; inserting a syphon tube in the outermost cylindrical vessel to fix the water level in the outermost cylindrical vessel throughout the duration of the test; applying a constant force to said loading rod, thereby moving said gasketed plunger through said cylindrical tube; and calculating permeability of the soil sample by taking measurements of vertical position of the gasketed plunger at multiple times during the falling head test.

In a further preferred embodiment, the method provided by configuration III.

BRIEF DESCRIPTION OF THE FIGURES

FIGS. 3A and 3B, wherein FIG. 3A depicts an inner sleeve for holding a soil sample in a soil permeameter and FIG. 3B depicts an outer sleeve for holding a soil sample, along with the inner sleeve and porous stones together in a soil permeameter.

FIGS. 4A and 4B, wherein FIG. 4A depicts a cylindrical tube for use in performing all tests detailed herein, with the soil permeameter and FIG. 4B depicts a second vessel used in conjunction with the vessel depicted in FIG. 4A for performing a falling head-rising tail test or a falling head test in a soil permeameter. FIG. 4B details the outermost cylindrical vessel (6), which is larger in diameter and height than the vessel in FIG. 4A and contains a solid bottom (essentially it serves as a bucket or reservoir, as the entirety of the cylindrical tube [5] in FIG. 4A sits within the larger vessel of FIG. 4B.) By contrast, the cylindrical tube (5), is a tube, with a circular opening at the top and bottom of the tube.

FIGS. 6A and 6B, wherein FIG. 6A depicts a rod of a soil permeameter device and

FIG. 6B depicts the rod with a gasket attached to one end.

FIG. 7 depicts a syphon of a soil permeameter.

FIGS. 10A and 10B depict a soil permeameter configured to perform a falling head test 103, with FIG. 10A depicting the initial condition and FIG. 10B depicting the final condition.

DETAILED DESCRIPTION OF THE INVENTION

Figure 1:
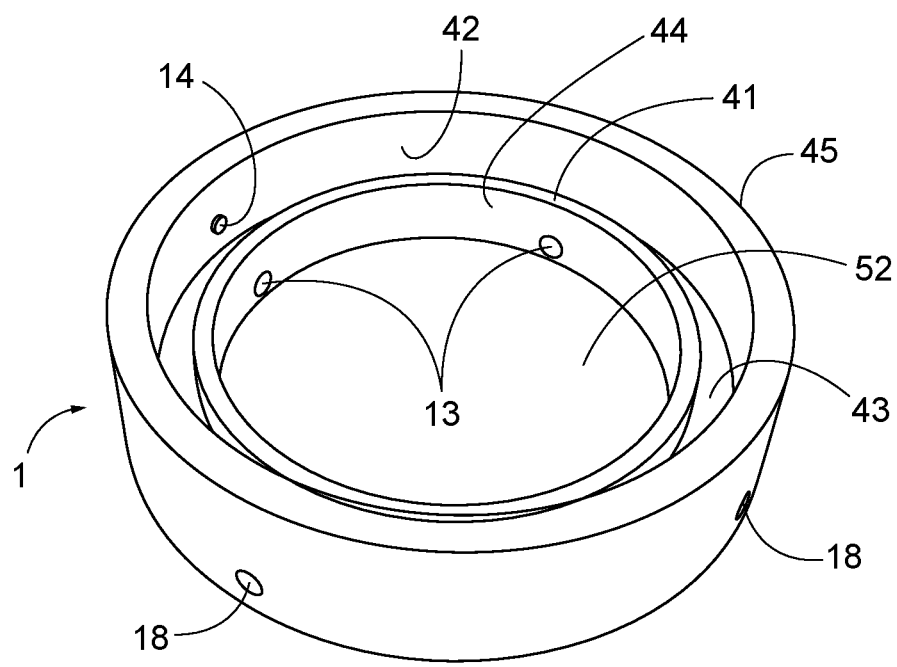
FIG. 1 depicts a pedestal feature configured to receive and accept certain sleeves of the invention and to selectively allow drainage of fluids through ports within the pedestal.

The permeability of different types of soils can vary by orders of magnitude. Knowledge of the permeability of the soil is required to design structures to reduce natural groundwater flow, to estimate flow into a tunnel or through a dam or other manmade structure, and to model the subsurface flow of liquid contaminants, among other applications. Similarly, knowledge of the permeability of soils placed as fill materials (such as those used to fill an excavation or natural depression) is required to estimate flow of fluid through those materials.

Soil permeability has historically been measured either using small samples in a laboratory or using field tests. Laboratory measurements of the soil permeability do not perfectly represent the permeability of the soil in the field due to the impossibility of obtaining truly undisturbed soil samples that accurately reflect the nonuniformity and anisotropy usually present in the field. Special methods can be used to obtain soil samples that are undisturbed in a practical sense, but these methods require specific tools and procedures. Despite these limitations, it is convenient and oftentimes acceptable to estimate soil permeability for field conditions using laboratory measurements.

Many conventional laboratory permeability devices are large, prone to bacterial growth, and take up valuable laboratory space or require specific instrumentation to perform tests. Furthermore, these devices are susceptible to error due to growth or formation of biofilms in the testing apparatus. Herein, a new device is detailed that utilizes a compact vertical test apparatus that allows for easy testing of soil permeability, including situations where bacterial growth must be controlled and where the soil and/or fluid are considered hazardous and require special disposal.

This section details the equipment configuration and processes for sample preparation, equipment assembly, saturation, deairing, and methods for applying and measuring loads and displacement. This section also details test procedures for constant head tests, falling head-rising tail tests, and falling head tests. The components of the device embodiment are shown generally in FIGS. 1-7, 11 and 12, and the test procedures are shown in FIGS. 8-10, which identify a starting and finished test procedure.

The components of the device embodiment generally include: a pedestal base (1), an outer sleeve (2), porous stones (3), an inner sleeve (4), a cylindrical tube (5), an outermost cylindrical vessel (6), a connector (7), a rod (8), a gasketed plunger (9), a syphon tube (10) (FIGS. 1-7, 11 and 12), and threaded plugs (not shown), which are positioned into ports in the pedestal base based on the particular type of test being performed.

FIG. 1 depicts a pedestal base (1). The pedestal base (1) is fabricated from a solid material, for example, stainless steel or a plastic. The pedestal base (1) serves as a support structure for additional elements, and comprises an outer wall (45), an inner wall (44), and a trough (43) between the inner wall (44) and outer wall (45). Inner drain ports (13) are extended between central portion (52) of the pedestal base (1), and the trough (43), which allows passage of fluids through said inner drain ports with an exit out of the outer drain port (18). Thus, there is a single passage with an opening at the inner drain port (13) and an exit at the outer drain port (18), with the connecting passage flowing underneath the trough (43). The height of the inner wall (44) is lower than the height of the outer wall (45). The trough (43) is of sufficient dimensions to allow for the receipt of a cylindrical tube (5) (Vessel A) into the recess of the trough (43). On the inner face of the outer wall (42), certain outer wall tabs (14) are positioned as male tabs extending into the trough (43). These outer wall tabs (14) are positioned to aid in locking a cylindrical tube (5) (Vessel A) when placed into the trough (43), to assist in creating a watertight seal. The bottom of the trough (43) will also receive a gasket, whether freely positioned or attached to the bottom of the trough (43), or to the bottom of a cylindrical tube placed into the trough (43). The gasket assists in creating a watertight seal. The inner wall (44) comprises an inner wall top face (41). The stainless steel material specified above may be interchanged for other materials having similar properties for the respective purpose, for example, a metallic material can be exchanged for another metal or alloy, a plastic, polymer, a composite, or another rigid material that prevents biological contamination. In cases where biological clogging is a concern, the inner drain ports (13) in the pedestal base (1) can be fashioned with an antibacterial metallic coating or insert (e.g., silver, copper, zinc).

Figure 2:
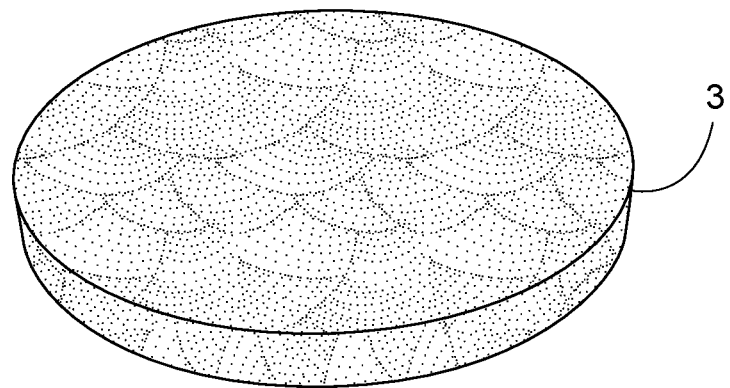
FIG. 2 depicts a view of a porous stone. A soil sample is sandwiched between upper and lower porous stones.
Figure 3A:
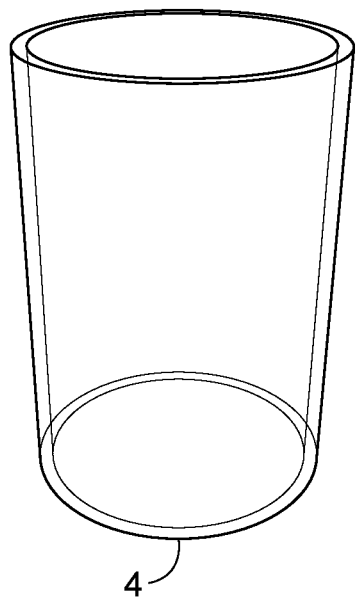
Figure 3B:
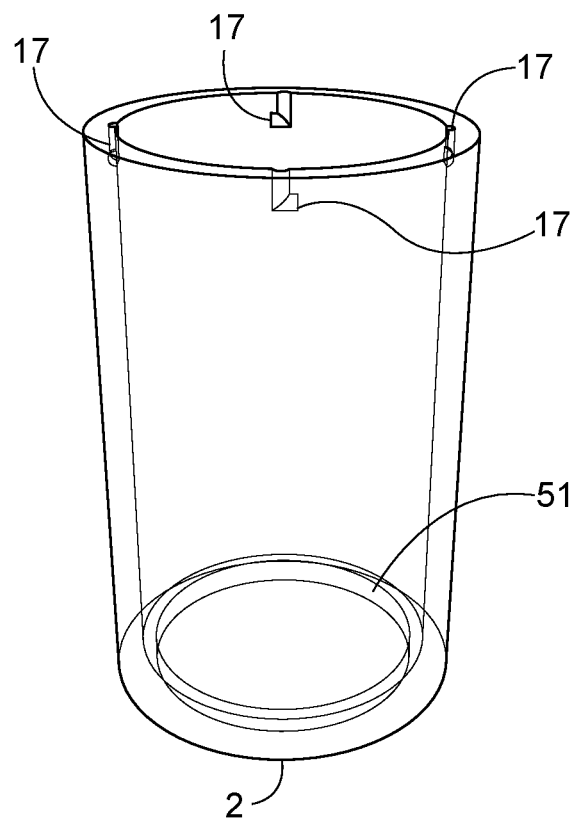
Figure 5A:
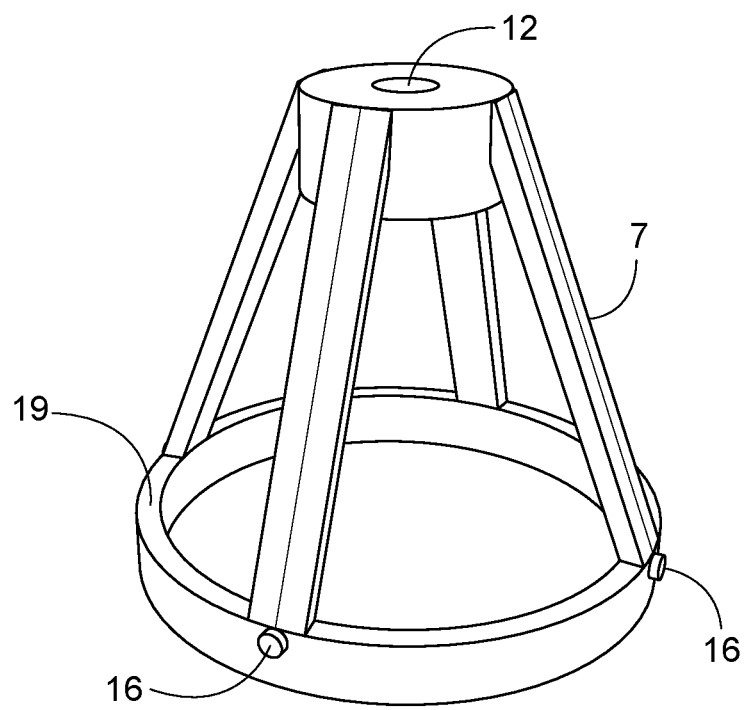
FIGS. 5A and 5B depict a connector and locking ring element of a soil permeameter, with FIG. 5A depicting a side perspective view and FIG. 5B depicting a top view.

FIG. 2 depicts a porous stone (3), and FIGS. 3A and 3B depict an inner sleeve (4), and an outer sleeve (2). Two substantially identical porous stones (3), one in contact with the bottom of the soil sample and another in contact with the top of the soil sample, have a diameter approximately equal to the outer diameter of the inner sleeve (4). Porous stones (3) are well understood in the geoengineering field, and stones typically have a permeability range of 15-18 ft$^3$ per square foot and an average pore size of 179 µm. However, the pore size may be greater or smaller on average than this number. Stones have a thickness of typically 0.125-0.50 in. and are typically made of aluminum oxide or sintered bronze. The diameter of the porous stone allows the porous stone at the bottom of the sample, lower porous stone (3A), to fit inside of the outer sleeve (2), and to be positioned on the flange (51) positioned inside of the outer sleeve (2). Then, the inner sleeve (4) sits on the porous stone (3), providing a secure spot for preparing a soil sample by filling until soil is flush with the top of the inner sleeve. The second porous stone, also known as the upper porous stone (3B), is placed in contact with the top of the inner sleeve and soil sample. Together, the two porous stones secure the soil sample. At the top of the outer sleeve (2), several locking recesses (17) are provided, to allow for receipt of the locking tabs (16) positioned on the locking ring (19) (FIG. 5A). When secured by the locking tabs, the locking ring is in contact with the upper porous stone.

Figure 4A:
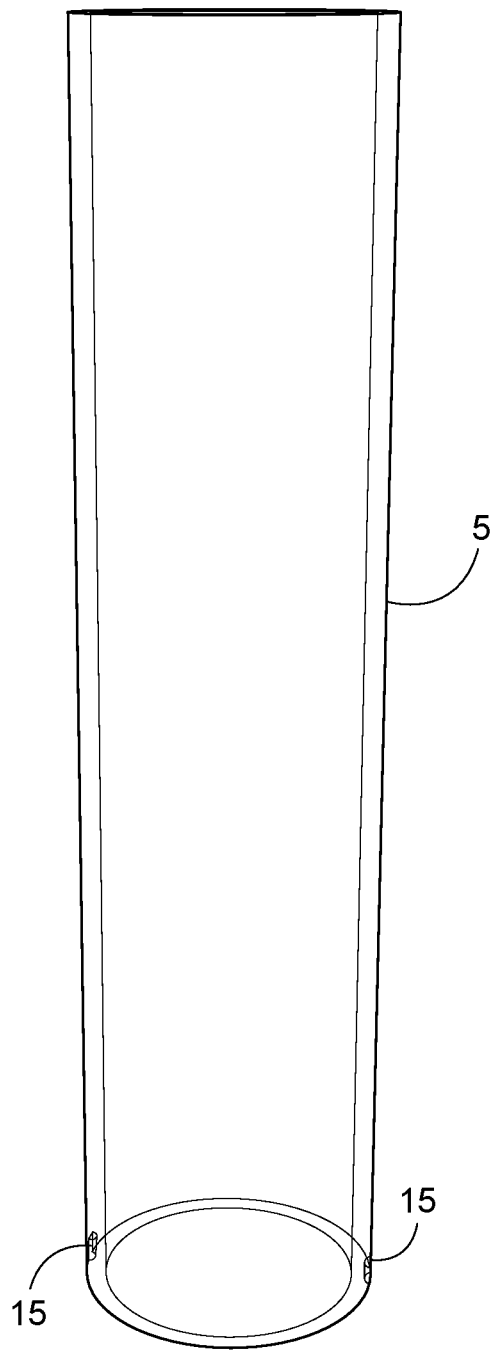
Figure 4B:
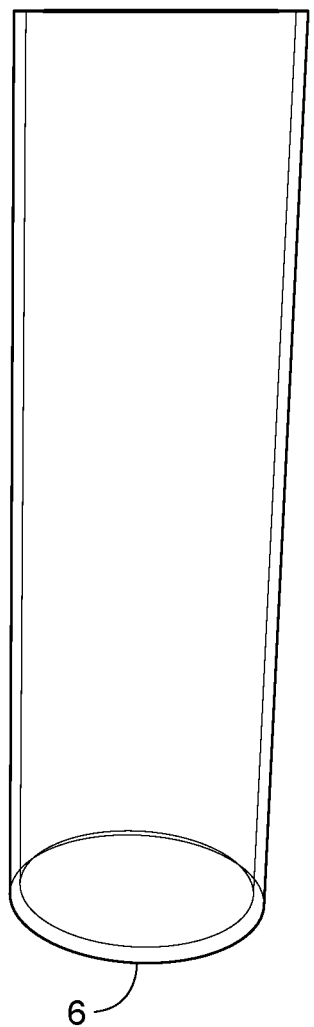

FIGS. 4A and 4B depict the cylindrical tube (5), and the outermost cylindrical vessel (6). The cylindrical tube (5) is used in all arrangements of the device, while the outermost cylindrical vessel (6), is only used with certain embodiments. When in use, the cylindrical tube (5) is attached to the pedestal base (1) using protruding tabs (14) on the pedestal base (1) and corresponding recesses (15) in the wall of the cylindrical tube (5). The connection is achieved by aligning the tabs with the recesses, sliding the cylindrical tube (5) down until the tabs reach the bottom of the vertical portion of the recesses, and twisting the cylindrical tube (5) until the tabs are no longer aligned with the vertical portion of the recess. When connected, the bottom of the cylindrical tube (5) is in contact with the trough (43) to create a watertight seal. A gasket between the trough (43) and the bottom of the cylindrical tube (5) may be used to ensure the watertight seal. The outer sleeve (2) then fits inside of the cylindrical tube (5), allowing the sample to be moved in a vertical manner within the cylindrical tube (5).

Soil Preparation

Test samples are prepared for testing using procedures that are consistent with conventional permeameter equipment. These procedures include trimming a sample from an undisturbed tube sample obtained from the field, moist laboratory compaction, and dry pluviation. Each sample preparation technique may be advantageous in different circumstances, which are known to those of ordinary skill in the art.

During sample preparation, a porous stone (3) is placed in the outer sleeve (2), to sit on the flange (51) and the inner sleeve (4) is placed on top of the porous stone (3). For undisturbed samples, the test specimen is extruded and trimmed from the tube sample into the inner sleeve (4) prior to placing into the outer sleeve (2). In some instances, the inner sleeve (4) is the tube sample. For pluviated and compacted samples, the sample is created within the inner sleeve (4) when assembled with the outer sleeve (2) and a lower porous stone (3A). The completed sample is filled to be approximately flush with the top of the inner sleeve (4).

After the sample is prepared within the sample assembly of the porous stone (3), the outer sleeve (2), and the inner sleeve (4), a second porous stone (3) is placed on top of the sample and inner sleeve (4). This sandwiches the soil sample (20) between two porous stones, a top stone (3B) and a bottom stone (3A), which retains the soil sample (20), but allows for the passage of fluid through the sample. To secure the soil sample, the locking ring (19) from FIGS. 5A and 5B is secured, with locking tabs (16), secured into the locking recesses (17) within the outer sleeve (2).

Figure 5B:
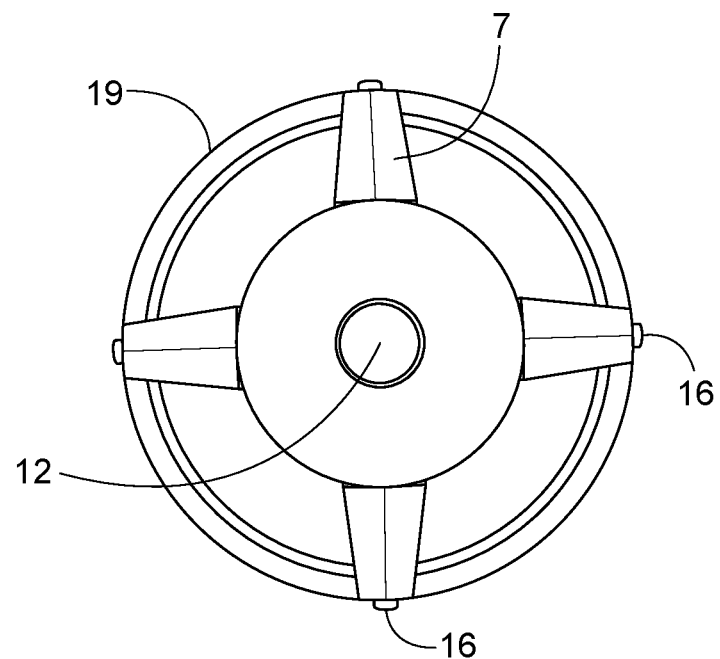

FIGS. 5A and 5B detail the connector (7) and the locking ring (19). To use the locking ring (19), it is attached to the outer sleeve (2) using four protruding tabs (16) located around the outer circumference of the locking ring (19) and four locking recesses (17) located around the inner circumference at the top of the outer sleeve (2). The connection is achieved by aligning the tabs with the recesses, sliding the locking ring (19) down until the tabs (16) reach the bottom of the vertical portion of the locking recesses (17) and twisting the locking ring (19) until the tabs (16) are no longer aligned with the vertical portion of the locking recesses (17). The connector (7) can be attached to the locking ring (19), whether manufactured as a single component or secured together by any attachment mechanism. Or the locking ring (19) can be utilized alone. The bottom of the locking ring (19) is flush with the top of the upper porous stone (3).

Figures 6A, 6B, 7:
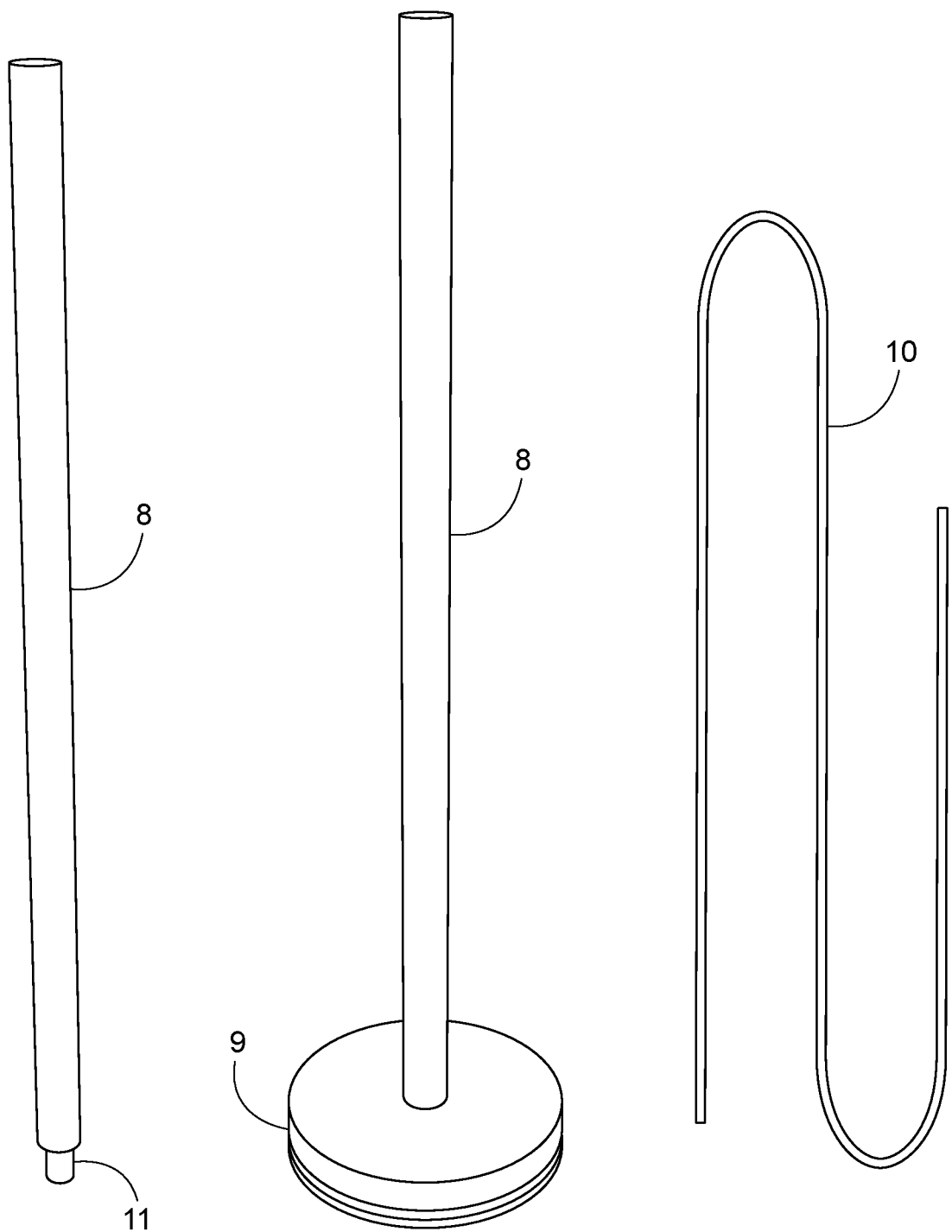

As in FIGS. 6A and 6B, prior to sample saturation, the threaded rod (8) is attached to the connector (7) using the threaded hole (12) located at the top of the connector (7), with the threaded end (11) of the rod (8). Alternatively, the threaded rod (8) can be attached to a plunger (9).

FIG. 7 details a syphon tube (10), which may be any length of tubing sufficient for the flow of the fluids through the samples and through the apparatus in the various forms. The syphon tube (10) may be a disposable or single-use tube, or a multiuse tube, as useful for the various tests and fluids used in the apparatus.

The vessels (6), tubes (5), and outer and inner sleeves (2 and 4) are preferably fabricated from transparent plastic. This allows for simple and inexpensive construction as well as visualization of the apparatus during setup and testing. The porous stones (3) are manufactured from aluminum oxide or sintered metal when biological clogging is a concern. The loading rod (8) is fabricated from stainless steel or another rigid material. The connector (7) and locking ring (19) are fabricated from plastic and the plunger (9) is fabricated from plastic and rubber. The syphon tube (10) is made from soft metal tubing or plastic. Threaded plugs are readily available metal, plastic, or rubber plugs that allow for secure closing of the aperture in the inner drain port (13) as necessary for each test.

Assembly

Figure 11:
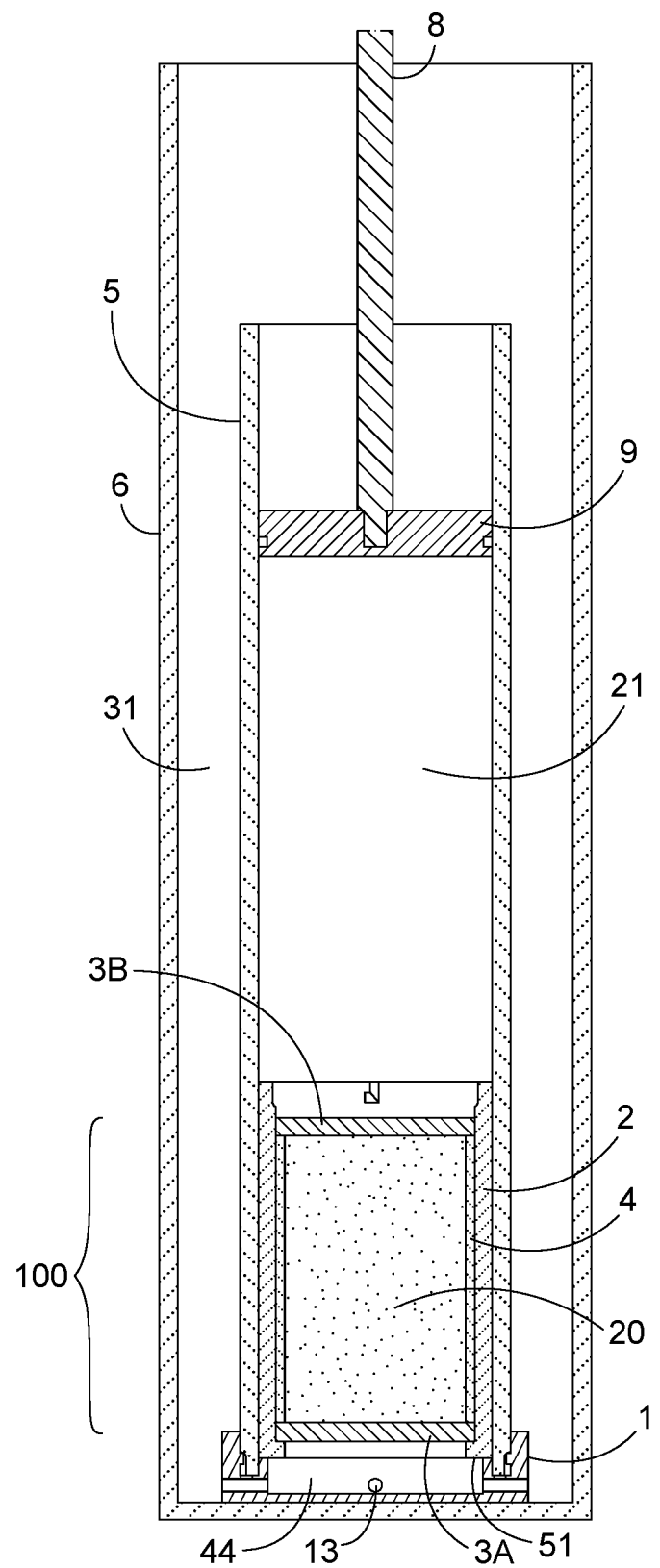
FIG. 11 depicts an enlarged view of an embodiment of a plunger within a testing apparatus.
Figure 12:
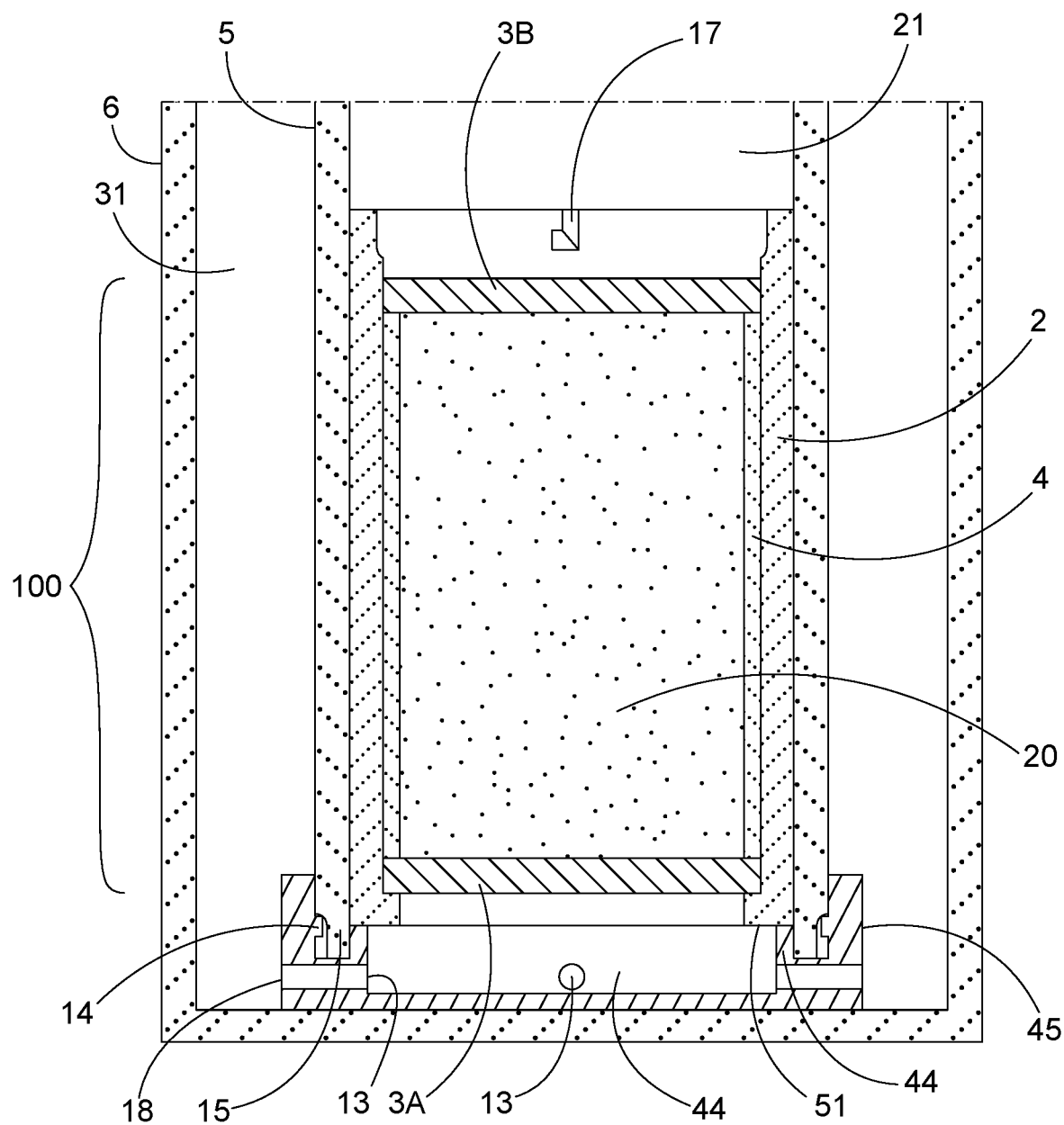
FIG. 12 depicts an enlarged view of an embodiment of a soil sample within a testing apparatus.

FIGS. 11 and 12 provide additional detail of a sample assembly. FIG. 11 provides a greater detail representation of the starting conditions of a falling head-rising tail test, with a plunger (9) attached to the rod (8), which is advantageous to show each of the components in the cross-sectional view. The soil sample (20) is prepared within the sample assembly (100). The sample assembly (100) comprises the outer sleeve (2), the inner sleeve (4), the porous stones (3), to sit on the top and bottom of the soil sample (20). The sample assembly (100) is positioned inside of the cylindrical tube (5), with the pedestal base (1) sitting within the outermost cylindrical vessel (6). This leaves a void space (31) for filling with fluid. The detail of the pedestal base (1) and the sample assembly (100) with the soil sample (20) are apparent in this cross-sectional view, with the inner drain port (13) depicted in the inner wall (44), with the cylindrical tube (5) positioned in the trough (43) and connected to the outer wall (45), with the locking tabs (14) engaging with the locking recess (15). FIG. 11 also details the position of the lower porous stone (3) and the flange (51) on the lower portion of the outer sleeve (2).

FIG. 12 provides a further detailed feature of the embodiments of the sample assembly (100) positioned with the elements of the device in a cross-sectional view to show details of how the components fit together. In particular, the drain port with an inner drain port (13) and the outer drain port (18) shown extending through the pedestal base (1). Accordingly, one of ordinary skill in the art would be able to arrange the components to prepare samples and perform the tests using the apparatus.

After the soil sample (20) is prepared within the sample assembly (100), the assembled sample is placed on the pedestal base (1). For constant head tests, the at least one internal drain port (13) or external drain port (18) are closed (i.e., plugged). One drain port comprising the inner drain port (13) and outer drain port (18) is required, but there may be several drain ports, as needed, and the example shows four different ports in the pedestal base (1). Each of the inner drain port (13) and outer drain port (18) may have a slip fit or threaded opening itself and may be closed with an appropriate plug. In contrast to the constant head tests, for falling head-rising tail tests and falling head tests, the ports are open (i.e., unplugged). This allows the fluids to flow out of the ports and into the outermost cylindrical vessel (6), which serves as the reservoir for the fluids.

For constant head tests, the assembly composed of the pedestal base (1), the sample assembly (100), the connector (7), the locking ring (19), and the cylindrical tube (5) is ready for sample saturation and fluid deairing. The drain ports (13 or 18) are closed or occluded to prevent the flow of any fluids through the port.

For both types of falling head tests, the assembly composed of the sample assembly (100), the connector (7), the locking ring (19), the pedestal base (1) with the drain ports (13 and 18) open, and the cylindrical tube (5) is placed within the outermost cylindrical vessel (6) before sample saturation and fluid deairing. The outer drain ports (18) are also open, allowing fluids to flow into the outermost cylindrical vessel (6). For the falling head test, a fixed tailwater elevation is maintained using a syphon tube (10). The syphon tube (10) is any tubing allowing for the sufficient transfer of the water to maintain the tailwater elevation during the test.

Saturating Sample and Deairing Fluid

The assembled equipment containing the sample is saturated using a multistep process:

A. Water is added to the cylindrical tube (5) until a stable nearly full level is obtained. For constant head tests, this means that water has filled the volume above the sample, within the sample and porous stones (3), and cavity within the pedestal base (1). For both types of falling head tests, a stable fluid level in the cylindrical tube (5) is obtained by filling the volume above the sample in the cylindrical tube (5), within the sample and porous stones, the cavity within the pedestal base (1), and the volume in the outermost cylindrical vessel (6) to reach the same water level in the cylindrical tube (5). For low permeability samples, the filling process can be assisted using a syphon tube (10) between the cylindrical tube (5) and the outermost cylindrical vessel (6). The sample and equipment should be allowed to rest to allow time for the sample to become close to fully saturated. Typically, the rest is between 1 minute and 24 hours to allow for saturation, including all numbers and ranges in between. The duration of the resting period is determined by tracking the water levels in the cylindrical tube (5) and the outermost cylindrical vessel (6) and confirming that they are equal and stable.

B. Full saturation requires purging the sample and fluid of small bubbles. Filling the equipment and sample with fluid that has already been deaired using accepted practices external to the present embodiment is preferred. Purging the sample of air is achieved by small vertical oscillations of rod (8) that is connected to the sample assembly (100) by the connector (7) and locking ring (19). The small vertical displacements are produced by moving the rod, for example, with a displacement-controlled load frame that is typical to soil laboratories. For higher permeability samples, the rod can be moved by hand if a load frame is not available. The small oscillations produce flow through the sample in the opposite direction of the movement. Cycling the flow direction creates turbulence that dislodges bubbles adhering to soil particles. A vacuum pump can be used to assist with deairing. A lid with a vacuum port placed over the cylindrical tube (5), in the case of a constant head test, or the outermost cylindrical vessel (6), in the cases of both types of falling head tests, can be used to seal the vessels and allow the vacuum pump to lower the air pressure within the equipment. Subatmospheric conditions assist saturation by lowering the equilibrium concentration of dissolved air.

C. For both types of falling head tests, the load is applied to the plunger (9), via a load controlling device known to those of ordinary skill in the art. After oscillating the sample in step (B), the rod (8) and connector (7) should be removed and replaced with the rod (8) and plunger (9). Small oscillations should be repeated as in step (B) using the rod (8) and plunger (9) to dislodge air bubbles on the rod (8) and plunger (9). This step is not performed for constant head tests. Once the sample is deaired, it is ready for testing.

Methods for Applying and Measuring Loads and Displacements

Using the present embodiment, flow through the sample is produced by moving the sample within the cylindrical tube (5) in the case of a constant head test and moving a plunger (9) within the cylindrical tube (5) in the cases of both types of falling head tests. Flow is produced by applying a constant load through the rod (8) to pressurize the upstream fluid. For constant head tests, the constant load will move the sample at a constant velocity, whereas the velocity of the plunger (9) will decrease over time for both types of falling head tests.

There are different means of applying load to the rod (8) that are common to a geotechnical laboratory. One way to apply load is to use a load-controlled load frame with a distance measuring instrument (e.g., dial gauge). This type of load frame has a base and an overhead loading mechanism consisting of a pressure regulated pneumatic cylinder or a platform (direct or lever-multiplied) for applying metal weights. Load is applied by placing the present embodiment in between the base of the frame and the loading mechanism. Vertical displacement is measured relative to the fixed base of the load frame.

A second way of applying load is to use a displacement-controlled load frame with an electronic load cell and distance measuring instrument. This type of load frame has a base and an overhead beam that are a fixed vertical distance apart. Displacement is produced by placing the present embodiment apparatus, load cell, and a mechanical or hydraulic jack in series between the fixed supports and extending or retracting the jack. Vertical displacement is measured relative to one of the fixed supports of the load frame and the corresponding vertical load is measured by the load cell. A type of displacement-controlled load frame common in modern labs uses a computer-controlled jack that can modulate the application of displacement to maintain a constant applied load. Therefore, the displacement-controlled load frame operates effectively as a load-controlled load frame.

A portion of the applied load will be resisted by friction between the components of the apparatus. For constant head tests, the primary source of friction is associated with movement of the outer sleeve (2) relative to the cylindrical tube (5). For both types of falling head tests, the primary source of friction is associated with movement of the plunger (9) relative to the cylindrical tube (5). Force due to friction should subtracted from the applied load in permeability calculations. Forces due to friction can be evaluated by applying a load to the rod (8) without a sample present within the inner sleeve (4) and recording resulting velocity of the outer sleeve (2) or plunger (9) using measurements of position and time as previously described. The friction force is expected to increase with increased velocity, so enough tests without samples should be performed using different applied loads to disclose the relationship between velocity and friction. Such friction force can then be utilized in any calculations.

Method for Leak Detection

It is assumed that all flow passes through the sample. Leakage between the components of the present embodiment can be checked by performing tests using a solid plastic cylinder in place of the soil sample. Since the solid plastic cylinder has the same dimensions as the soil sample, but is impermeable, there should be no flow. Under these conditions, any movement of the rod (8), whether connected to the connector (7) or plunger (9) indicates leakage. Accordingly, the seal is necessary between the cylindrical tube (5) and the outer sleeve (2). Leakage can be remedied by repairing parts and/or applying a light nonwater soluble grease to sliding components to restore a watertight seal, via a gasket, or by ensuring tolerances are sufficient to meet these requirements. Accordingly, it is important that the materials herein are produced in such tolerance to ensure the watertight seal.

Procedure for Constant Head Test

Figure 8A:
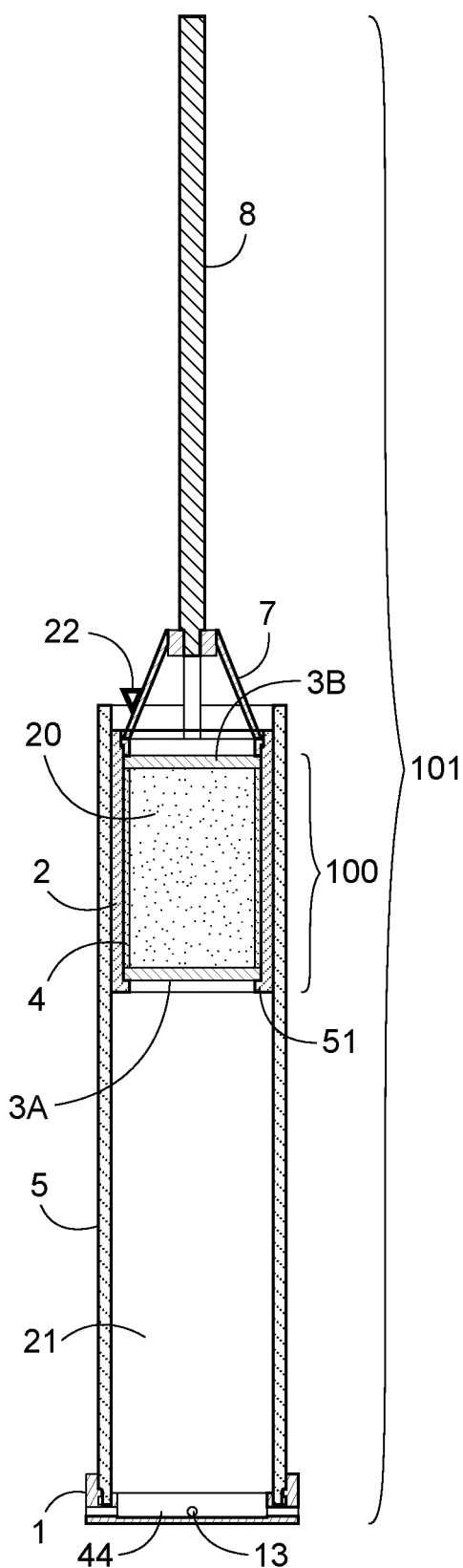
FIGS. 8A and 8B depict a soil permeameter configured to perform a constant head test 101, with FIG. 8A depicting the initial condition and FIG. 8B depicting the final condition.
Figure 8B:
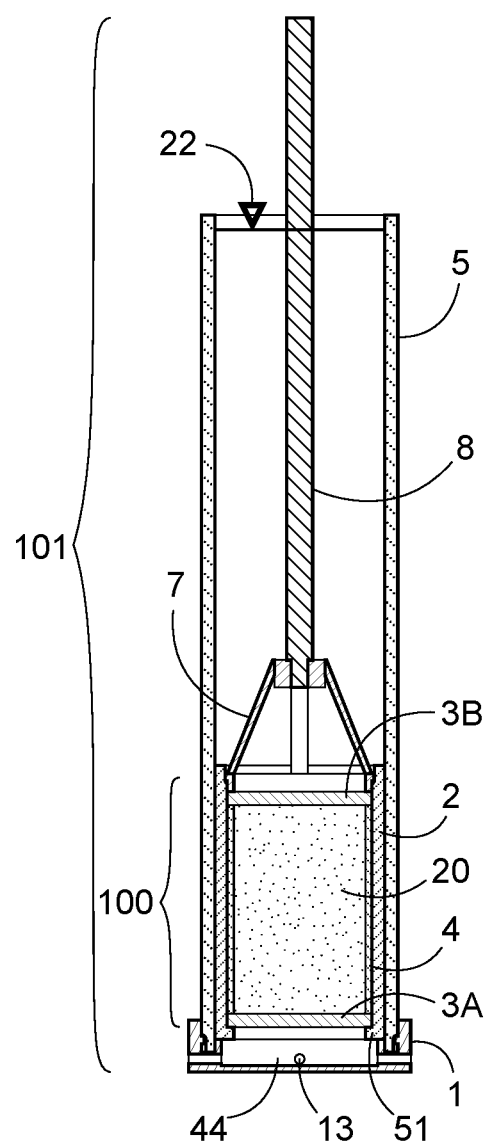

The procedure using the present embodiment for a constant head test begins with an initial condition consisting of a saturated sample and deaired fluid. The test is depicted by FIG. 8A being the starting point and FIG. 8B being a finishing point in the test. Notably, the head water (21) and the head water level (22) are depicted in these figures, as the device now contains fluids. The test is performed using the following steps:

i. Setup the device, prepare the sample, deair the sample, and then apply a constant load to the rod (8);

ii. Measure the velocity of the sample through the vessel by measuring the sample position at multiple times throughout the travel of the sample. The velocity should be constant.

iii. Repeat steps (i) and (ii) for different loads as desired to explore possible errors introduced as the imposed hydraulic gradient is changed (e.g., turbulence, internal erosion).

Procedure for Falling Head-Rising Tail Test

Figure 9A:
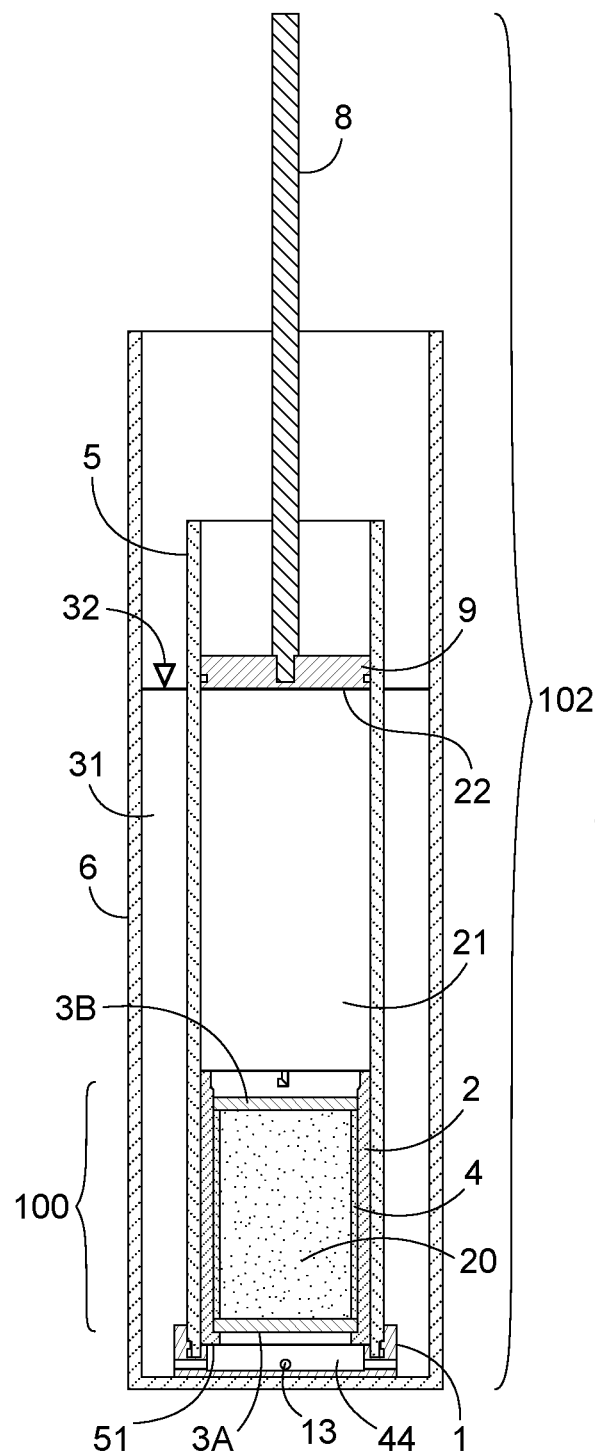
FIGS. 9A and 9B depict a soil permeameter configured to perform a falling head-rising tail test (102), with FIG. 9A depicting the initial condition and FIG. 9B depicting the final condition.
Figure 9B:
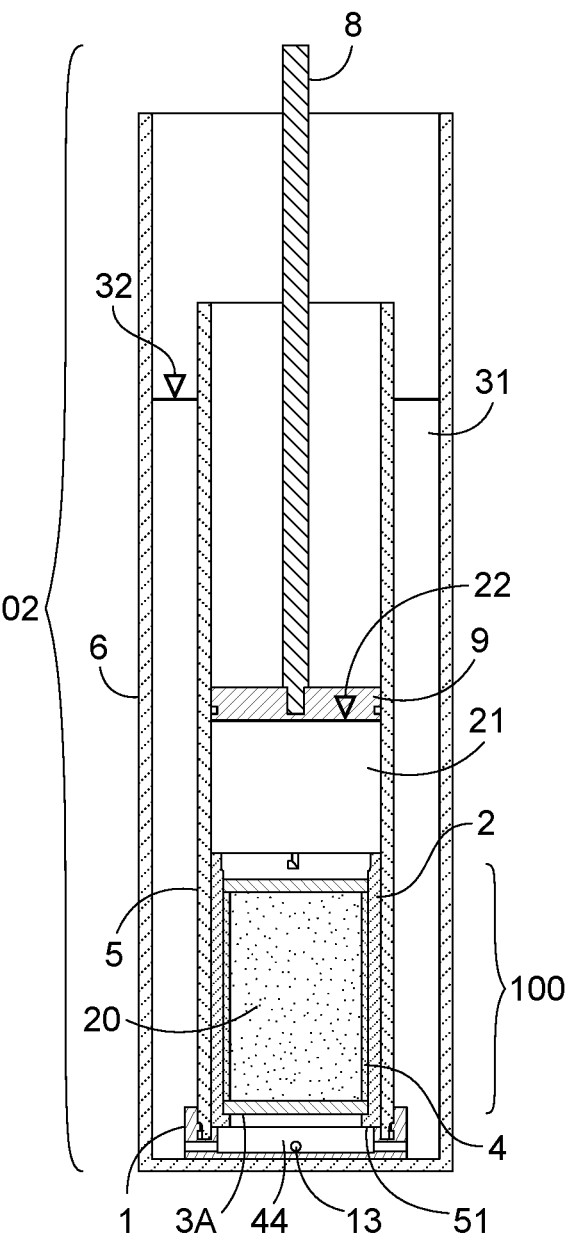

The procedure using the present embodiment for a falling head-rising tail test is depicted by FIGS. 9A and 9B. FIG. 9A begins with an initial condition consisting of a saturated sample, deaired fluid and the same water level in both the cylindrical tube (5) and the outermost cylindrical vessel (6), which is set up according to the various parameters detailed above. FIG. 9A shows the first position, with the head water

(21) and the head water level (22) being the same level as the tail water level (32). This changes as the plunger is pressed through during the test, showing the different levels in FIG. 9B. The test is performed using the following steps:
  i. Apply a constant load to the rod (8).
  ii. Measure the position of the plunger at multiple times throughout the travel of the plunger. The velocity is not expected to be constant.
  iii. Repeat steps (i) and (ii) for different loads as desired to explore possible errors introduced as the imposed hydraulic gradient is changed (e.g., turbulence, internal erosion)

Procedure for Falling Head Test

The procedure using the present embodiment for a falling head test is depicted by FIGS. 10A and 10B, with a fixed tailwater elevation begins with an initial condition consisting of a saturated sample as shown in FIG. 10A, deaired fluid and the same water level in the cylindrical tube (5), the outermost cylindrical vessel (6), and the outlet of the syphon tube (10), with a syphon discharge (33) at the end of the syphon tube (10). Again, the head water (21), the head water level (22), and the tail water level (32) are depicted with the device, with the levels changing from FIG. 10A to FIG. 10B as the test progresses. The test is performed using the following steps:
  i. Apply a constant load to the rod (8).
  ii. Measure the position of the plunger at multiple times throughout the travel of the plunger. The velocity is not expected to be constant.
  iii. Repeat steps (i) and (ii) for different loads as desired to explore possible errors introduced as the imposed hydraulic gradient is changed (e.g., turbulence, internal erosion).

Assumptions

The assumptions associated with permeability estimates made using the present embodiment include:
  a. Darcy's Law is valid;
  b. All flow passes through the sample (i.e., there is no leakage);
  c. There is a relationship between the relative velocity of moving parts (i.e., outer sleeve or plunger) and friction. The relationship can be determined by performing tests without a sample as described above; and
  d. The permeability of the porous stones is known.

Notation
  e. Let:
  f. $h_u$=total upstream hydraulic head
  g. $h_d$=total downstream hydraulic head
  h. $\Delta h$=head difference across the sample, $h_u-h_d$
  i. L=length of sample and porous stones parallel to hydraulic gradient
  j. i=composite hydraulic gradient through the sample and porous stones=$(h_u-h_d)/L$
  k. $z_s$=height of top of sample above common datum
  l. $z_A$=height of water surface in cylindrical tube above common datum
  m. $\Delta z_A$=change in height of water surface in cylindrical tube from initial condition
  n. $z_B$=height of water surface in Vessel B above common datum
  o. t=time
  p. $t_1$=elapsed Time 1
  q. $t_2$=elapsed Time 2
  r. $A_s$=gross cross-sectional area of sample
  s. $A_{A,I}$=cross-sectional area of cylindrical tube using inside diameter
  t. $A_{A,O}$=cross-sectional area of cylindrical tube using outside diameter
  u. $A_{B,I}$=cross-sectional area of Vessel B using inside diameter
  v. P=net applied load on sample, measured load minus friction
  w. v=applied or measured Darcy flow velocity
  x. V=fluid volume
  y. Q=volumetric flow rate with respect to time, dV/dt
  z. y=fluid unit weight
  aa. k=the composite permeability of the soil sample and porous stones
  bb. $k_{stone}$=the permeability of the porous stones
  cc. $L_{stone}$=the combined thickness of the porous stones parallel to the hydraulic gradient
  dd. $k_{soil}$=the permeability of the soil
  ee. $L_{soil}$=the thickness of the soil parallel to the hydraulic gradient Fundamental Relationship, Darcy's Law
  ff. Darcy's Law applies to laminar flow through fully saturated soil.

$$v=ki \qquad \text{(Eq. 1)}$$

$$Q=vA_s \qquad \text{(Eq. 2)}$$

Relationships for Constant Head Tests
  gg. The flow through the sample is in the opposite direction as the sample movement. The Darcy flow through the sample equals the flow from the upstream to downstream side of the cylindrical tube (5).

$$Q = -\frac{dz_s}{dt}A_{A,I} = kiA_s \qquad \text{(Eq. 3)}$$

hh. The difference between the upstream and downstream heads equals the change in pressure head in the upstream fluid due to the applied load.

$$\Delta h = h_u - h_d = \frac{P}{A_{A,I}\gamma} \qquad \text{(Eq. 4)}$$

ii. The hydraulic gradient equals:

$$i = \frac{P}{A_{A,I}\gamma L} \qquad \text{(Eq. 5)}$$

jj. Therefore, combining Eqs. 3 and 5, the permeability is estimated according to:

$$k = \left(-\frac{dz_s}{dt}\right)\frac{A_{A,I}^2 \gamma L}{A_s P} \qquad \text{(Eq. 6)}$$

Relationships for Falling Head Tests with Fixed Tailwater Elevation
  kk. The sample is contained within the cylindrical tube (5) and drainage from the cylindrical tube (5) flows into the outermost cylindrical vessel (6) and is drained from the system using a syphon tube (10). The flow through the sample is in the same direction as the plunger (9) movement and the Darcy velocity is not constant for a constant applied load. It is assumed that $z_A$ initially equals $z_B$.

ll. The difference between the upstream and downstream heads equals the change in pressure head in the upstream fluid due to the applied load, plus the change in water elevation in the cylindrical tube (5). Lowering of the water level by pushing the plunger (9) down corresponds to a negative change in water elevation.

$$\Delta h = h_u - h_d = \frac{P}{A_{A,I}\gamma} + \Delta z_A \qquad (Eq.\ 7)$$

mm. The head difference is not constant with time, and therefore the volumetric flow rate is not constant with time. The volumetric flow rate equals the differential volume of water in the cylindrical tube (5) displaced by the plunger (9) with respect to time.

$$Q = -\frac{dz_A}{dt} A_{A,I} \qquad (Eq.\ 8)$$

nn. Combining Eqs. 1, 2, and 8 yields:

$$-\frac{dz_A}{dt} A_{A,I} = \frac{kA_s}{L}[\Delta h] \qquad (Eq.\ 9)$$

oo. By inspection of Eq. 7 and recognizing that the applied load is invariant with time, the derivative of the head difference with respect to time equals:

$$\frac{d\Delta h}{dt} = \frac{dz_A}{dt} \qquad (Eq.\ 10)$$

pp. Substituting Eq. 10 into Eq. 9 and rearranging produces:

$$dt = \left(-\frac{d\Delta h}{\Delta h}\right)\frac{L}{k}\left(\frac{A_{A,I}}{A_s}\right) \qquad (Eq.\ 11)$$

qq. After integration of Eq. 12 and some manipulation, it is seen that permeability is estimated by comparing the elevation of the water in the cylindrical tube (5) at two elapsed times, $t_1$ and $t_2$.

$$\int_{t_1}^{t_2} dt = \int_{\Delta h_1}^{\Delta h_2}\left(-\frac{d\Delta h}{\Delta h}\right)\frac{L}{k}\left(\frac{A_{A,I}}{A_s}\right) \qquad (Eq.\ 12)$$

$$k = \frac{L}{(t_2 - t_1)} \ln\left(\frac{\Delta h_1}{\Delta h_2}\right)\left(\frac{A_{A,I}}{A_s}\right) \qquad (Eq.\ 13)$$

$$k = \frac{L}{(t_2 - t_1)} \ln\left(\frac{1 + \frac{\Delta z_{A,t_1}\gamma A_{A,I}}{P}}{1 + \frac{\Delta z_{A,t_2}\gamma A_{A,I}}{P}}\right)\left(\frac{A_{A,I}}{A_s}\right) \qquad (Eq.\ 14)$$

Relationships for Falling Head Tests with Rising Tailwater Elevation rr. The sample is contained within the cylindrical tube (5) and drainage from the cylindrical tube (5) flows into the outermost cylindrical vessel (6) and is not drained from the system. Rather, the water level in the outermost cylindrical vessel (6) rises to accommodate the flow volume from the cylindrical tube (5). The flow through the sample is in the same direction as the plunger movement and the Darcy velocity is not constant for a constant applied load. It is assumed that $z_A$ initially equals $z_B$.

ss. The upstream head equals the downstream head plus the change in pressure head in the upstream fluid due to the applied load, plus the change in water elevation in the cylindrical tube (5), minus the change in water elevation in the outermost cylindrical vessel (6). An increase in water level in a vessel corresponds to a positive change in water elevation. Under a normal testing scenario, the plunger (9) in the cylindrical tube (5) lowers the water elevation in the cylindrical tube (5) (i.e., $\Delta z_A$ is negative) causing flow into the outermost cylindrical vessel (6), which raises the water elevation in the outermost cylindrical vessel (6) (i.e., $\Delta z_B$ is positive).

$$\Delta h = h_u - h_d = \frac{P}{A_{A,I}\gamma} + \Delta z_A - \Delta z_B \qquad (Eq.\ 15)$$

tt. The head difference is not constant with time, and therefore the volumetric flow rate is not constant with time. Since the volume of water is conserved between the cylindrical tube (5) and the outermost cylindrical vessel (6):

$$\Delta z_B = -\Delta z_A\left(\frac{A_{A,I}}{A_{B,I} - A_{A,O}}\right) \qquad (Eq.\ 16)$$

uu. Therefore:

$$\Delta h = \frac{P}{A_{A,I}\gamma} + \Delta z_A\left(1 + \frac{A_{A,I}}{A_{B,I} - A_{A,O}}\right) \qquad (Eq.\ 17)$$

vv. As with the falling head test, the volumetric flow rate equals the differential volume of water in the cylindrical tube (5) displaced by the plunger (9) with respect to time (Eq. 8).

ww. By inspection of Eq. 18 and recognizing that the applied load is invariant with time, the derivative of the head difference with respect to time equals:

$$\frac{d\Delta h}{dt} = \left(1 + \frac{A_{A,I}}{A_{B,I} - A_{A,O}}\right)\frac{dz_A}{dt} \qquad (Eq.\ 18)$$

xx. Substituting Eq. 18 into Eq. 9 and rearranging produces:

$$dt = \left(-\frac{d\Delta h}{\Delta h}\right)\frac{L}{k}\left(\frac{A_{A,I}}{A_s}\right)\left(\frac{1}{1 + \frac{A_{A,I}}{A_{B,I} - A_{A,O}}}\right) \qquad (Eq.\ 19)$$

yy. After integration of Eq. 12 and some manipulation, it is seen that permeability is estimated by comparing the elevation of the water in the cylindrical tube (5) at two elapsed times, $t_1$ and $t_2$.

$$\int_{t_1}^{t_2} dt = \int_{\Delta h_1}^{\Delta h_2} \left(-\frac{d\Delta h}{\Delta h}\right) \frac{L}{k} \left(\frac{A_{A,I}}{A_s}\right) \left(\frac{1}{1 + \frac{A_{A,I}}{A_{B,I} - A_{A,O}}}\right) \quad \text{(Eq. 20)}$$

$$k = \frac{L}{(t_2 - t_1)} \ln\left(\frac{\Delta h_1}{\Delta h_2}\right) \left(\frac{A_{A,I}}{A_s}\right) \left(\frac{1}{1 + \frac{A_{A,I}}{A_{B,I} - A_{A,O}}}\right) \quad \text{(Eq. 21)}$$

(Eq. 22)

$$k = \frac{L}{(t_2 - t_1)} \ln$$

$$\left(\frac{1 + \frac{\Delta z_{A,t_1} \gamma A_{A,I}}{P}\left(1 + \frac{A_{A,I}}{A_{B,I} - A_{A,O}}\right)}{1 + \frac{\Delta z_{A,t_2} \gamma A_{A,I}}{P}\left(1 + \frac{A_{A,I}}{A_{B,I} - A_{A,O}}\right)}\right) \left(\frac{A_{A,I}}{A_s}\right) \left(\frac{1}{1 + \frac{A_{A,I}}{A_{B,I} - A_{A,O}}}\right)$$

Estimation of Soil Permeability zz. Using the composite permeability calculated from any of the three tests described herein, the permeability of the soil is estimated by:

$$k_{soil} = k\left(\frac{L_{soil}}{L - \frac{k}{k_{stone}} L_{stone}}\right) \quad \text{(Eq. 23)}$$

Accordingly, the device as depicted in the figures and described herein can be utilized in a number of different orientations to allow for testing of permeability of a soil sample.

A preferred embodiment, therefore, is directed toward a soil sample apparatus comprising a pedestal base (1), wherein said pedestal base (1) comprises an inner raised wall (44) having a first height, and an outer raised wall (45) having a second height, wherein the inner raised wall (44) is lower in height than the outer raised wall (45). Thus, the first height is lower than the second height. A trough (43) defined between the outer and inner walls of dimensions configured to accept therein a cylindrical tube (5), and at least one port extending through the outer wall (45) and said inner wall (44), and a loading rod (8), wherein a sample is prepared to fit within the cylindrical tube (5), said sample comprising an inner sleeve (4), and an outer sleeve (2); said inner sleeve (4) nesting within said outer sleeve (2), and comprising an upper porous disk (3B), and a lower porous disk (3A), wherein said outer sleeve (2), comprises a lower flange (51) for receiving the lower porous disk (3A). Said sample further comprising a locking ring (19), wherein said ports can be modified from a first open position to a second closed position.

The apparatus allows for the soil sample to be moved through a column of fluids within the cylindrical tube (5), or wherein a plunger, attached to said loading rod (8), forces fluids through the soil sample. This apparatus, therefore, allows for certain tests regarding permeability of the soil, as configured in the various orientations of the device.

Those of ordinary skill in the art will recognize that the apparatus and the methods herein can be modified without diverging from the spirit and scope of the invention. Thus, the presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A soil sample permeability testing apparatus comprising a pedestal base, said pedestal base comprising an inner raised wall having a first height and an outer raised wall having a second height, said first height being shorter than said second height, a trough defined between the outer raised wall and the inner raised wall of dimensions configured to accept therein a cylindrical tube, said cylindrical tube having an inner diameter, and at least one passage having an inner port on said inner raised wall and extending through the outer raised wall through an outer port for fluid connection through said passage, a loading rod, and a sample assembly.

2. The apparatus of claim 1 wherein the sample assembly comprises an inner sleeve and an outer sleeve; said inner sleeve nesting within said outer sleeve and comprising an upper porous disk and a lower porous disk, each of said upper porous disk and said lower porous disk having a diameter, wherein said outer sleeve comprises a lower flange positioned on an inner face at a bottom of said outer sleeve for receiving the lower porous disk; and a locking ring, said locking ring having a diameter, and said locking ring comprising a locking mechanism to attach said locking ring to said outer sleeve, thereby locking said upper porous disk into place.

3. The apparatus of claim 2 wherein a sample is defined within said sample assembly.

4. The apparatus of claim 1 wherein said inner port and said outer port can be modified from an open position to a closed position.

5. The apparatus of claim 1 wherein said outer raised wall comprises an inner face and wherein said inner face comprises at least one locking tab which engages with at least one locking recess on said cylindrical tube.

6. The apparatus of claim 5 wherein upon locking said locking tab in said at least one locking recess a watertight seal is created between said cylindrical tube and said pedestal base.

7. The apparatus of claim 6 further comprising a gasket between said cylindrical tube and said pedestal base.

8. The apparatus of claim 2 wherein the diameters of the upper porous disk, the locking ring, and the lower porous disk are of a smaller diameter than the inner diameter of the cylindrical tube.

9. The apparatus of claim 2 wherein the sample assembly creates a watertight seal between the outer sleeve and the cylindrical tube; and wherein said sample assembly has a watertight slip fit within said cylindrical tube.

10. The apparatus of claim 9 wherein the sample assembly comprises a compressible circumferential seal which is of a diameter to be in direct contact with the inner diameter of the cylindrical tube.

11. The apparatus of claim 2 wherein the loading rod is secured to the sample assembly via a connector and wherein the sample assembly slidably engages an interior surface of the cylindrical tube through a force applied to the loading rod.

12. A method of performing a constant head test comprising:

creating a soil sample within an outer sleeve, wherein the outer sleeve achieves a watertight slip fit into a cylindrical tube; said cylindrical tube oriented onto a pedestal base comprising an inner raised wall, an outer raised wall, and a trough therebetween, with at least one passage having an inner port defining a passage through the inner raised wall and an outer port in the outer raised wall, at least one of said inner port or said outer port being closed to prevent fluid from exiting the pedestal base, and a connector which is attached to a loading rod;

saturating the soil sample with a fluid within the cylindrical tube;

applying a constant force to said loading rod, thereby moving said soil sample through said cylindrical tube; and calculating permeability of the soil sample by taking measurements of vertical velocity of the soil sample due to the applied constant force.

13. A method of performing a falling head-rising tail test comprising:

creating a soil sample within an outer sleeve, wherein the outer sleeve achieves a watertight slip fit into a cylindrical tube; said cylindrical tube oriented onto a pedestal base comprising an inner raised wall, an outer raised wall, and a trough therebetween, with four passages each having a first projection through the inner raised wall and a second projection through the outer raised wall open to allow fluid to be exchanged between the pedestal base and an outermost cylindrical vessel; and a gasketed plunger which is attached to a loading rod;

saturating the soil sample with a fluid within the cylindrical tube and achieving an initial fluid level in the outermost cylindrical vessel;

applying a constant force to said loading rod, thereby moving said gasketed plunger through said cylindrical tube; and calculating permeability of the soil sample by taking measurements of vertical position of the gasketed plunger at multiple times during the falling head-rising tail test.

* * * * *